July 14, 1936.  W. H. GREENLEAF  2,047,681
WEIGHING SCALE
Filed Feb. 19, 1934  2 Sheets-Sheet 1
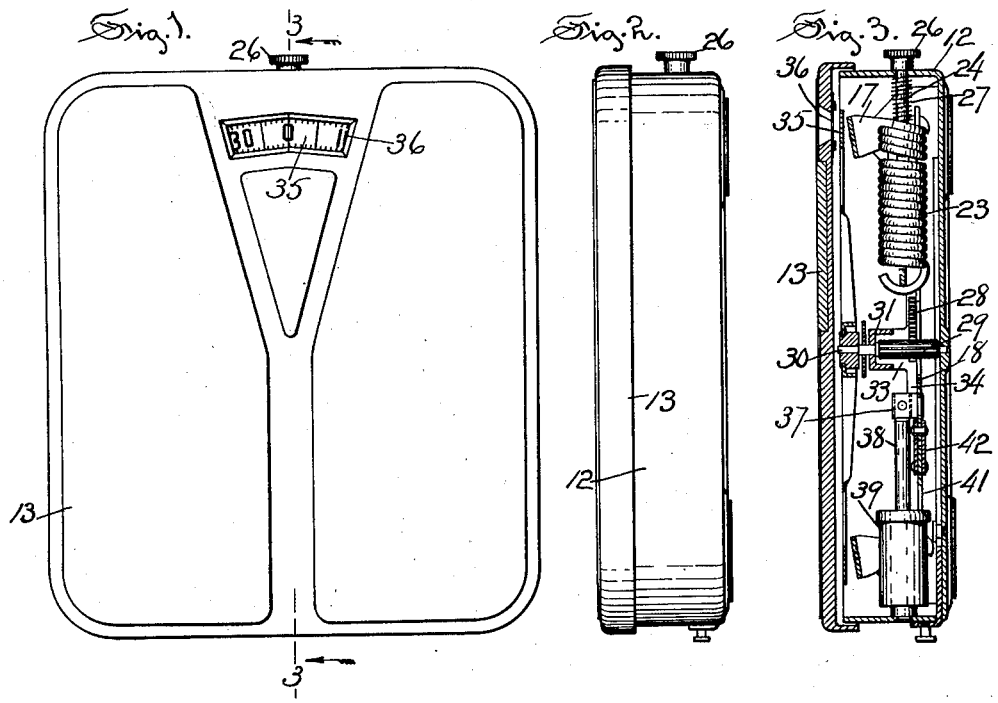
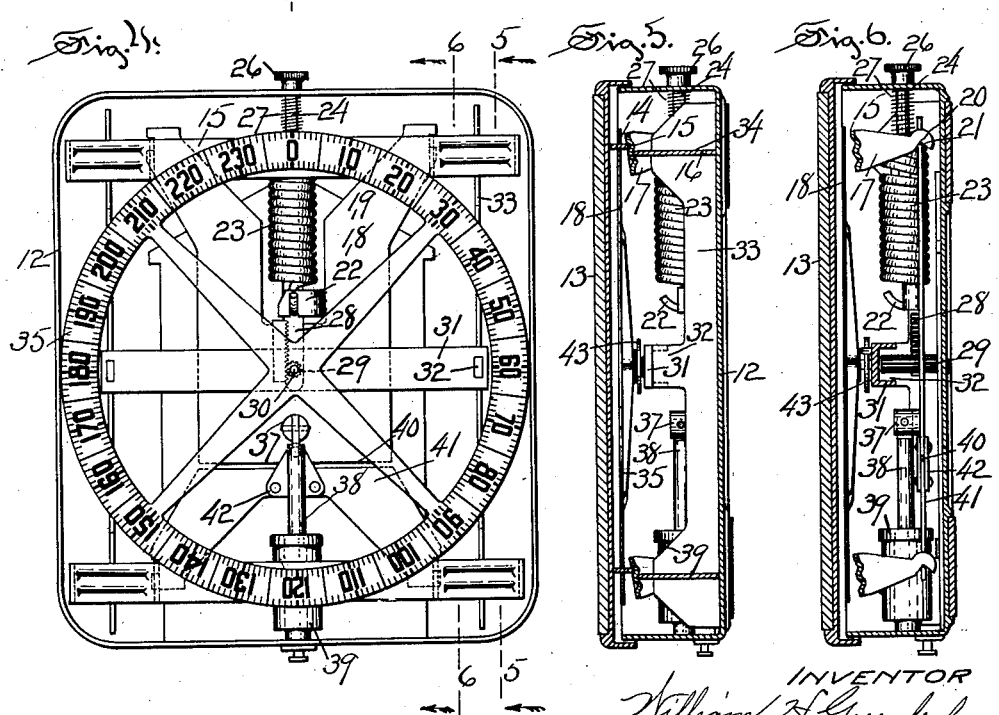
INVENTOR
William H. Greenleaf,
By Arthur B. Jenkins
ATTORNEY July 14, 1936.  W. H. GREENLEAF  2,047,681
WEIGHING SCALE
Filed Feb. 19, 1934  2 Sheets-Sheet 2
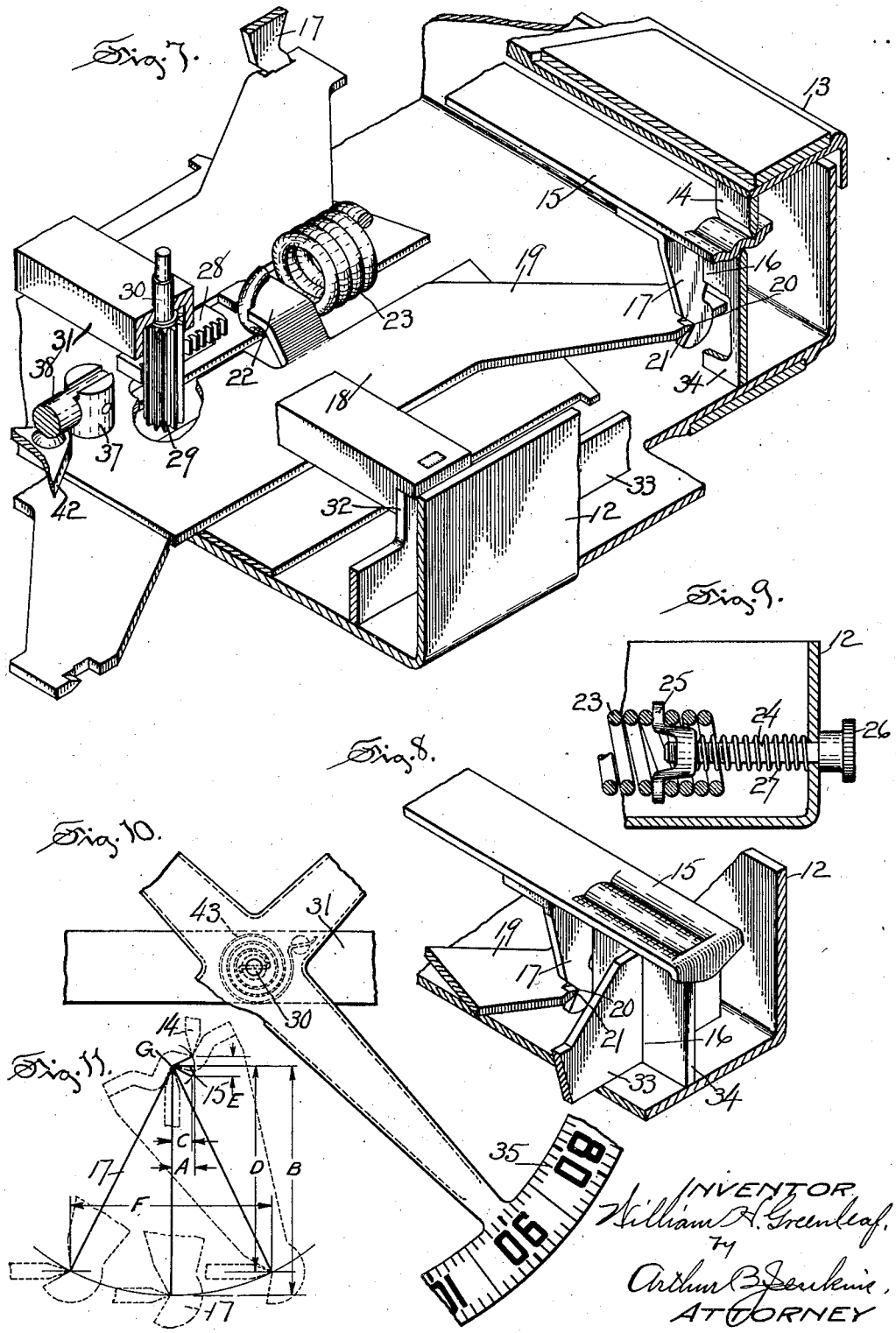

Patented July 14, 1936

2,047,681

UNITED STATES PATENT OFFICE 2,047,681

WEIGHING SCALE

William H. Greenleaf, Hartford, Conn.

Application February 19, 1934, Serial No. 712,005

9 Claims. (Cl. 265—68)

My invention relates to weighing scales, and an object of my invention, among others, is to provide an article of this type that shall be exceedingly compact, extremely accurate and one that may be readily moved about and which will occupy but little space.

One form of a weighing scale embodying my invention and in the construction and use of which the objects herein set out, as well as others, may be attained is illustrated in the accompanying drawings in which—

Figure 1 is a plan view of my improved weighing scale.

Figure 2 is an edge view of the same.

Figure 3 is a view in vertical section on a plane denoted by the dotted line 3—3 of Figure 1.

Figure 4 is a top view with the cover removed.

Figure 5 is a vertical section on the plane denoted by the dotted line 5—5 of Figure 4.

Figure 6 is a similar view on the plane denoted by the dotted line 6—6 of Figure 4.

Figure 7 is an isometric view on enlarged scale showing a fragment of my improved device.

Figure 8 is a similar view illustrating the mounting of a rocker on the supports therefor.

Figure 9 is a detail view to the same scale and illustrating means for adjustment of the weighing spring.

Figure 10 is a plan view of a portion of the dial illustrating means for preventing lost motion therein.

Figure 11 is a diagrammatic view illustrating the application of weight force and the resistance thereto in a manner to preserve the ratio between such force and resistance during variations in the application of the force.

In the accompanying drawings the numeral 12 denotes a case in which the mechanism of my improved scale is enclosed, this case being preferably rectangular in form and having a platform cover 13 of a size with respect to the case to permit free vertical movement of the cover independently of the case. Supports 14 project from the underside of the cover, preferably adjacent the corners thereof, these supports having knife edges that rest in grooves in rockers 15, in the arrangement herein shown the members of a pair of supports at one edge of the cover resting in grooves at opposite ends of the rockers, there being a rocker at each of the opposite ends of the cover and a support at each end of each rocker. Each rocker preferably has a groove in its under surface at opposite ends thereof in which are received knife edge bearings at the upper ends of rocker supports 16 extending upwardly from side bars to be hereinafter described, and as shown clearly in Fig. 7 of the drawings. Spider supporting arms 17 projecting downwardly from the underside of each rocker at opposite ends thereof support an equalizing spider 18, said spider having branching arms 19 at opposite ends which are engaged with the supporting arms 17, as shown herein said arms having notches 20 each to receive the knife edge 21 at one edge of a notch in an edge of one of the arms 19. The rockers 15 and the depending supporting arms 17 function as bell-crank levers in their association with the spider 18 and platform 13.

A hook 22 is bent up from an opening in the spider near the center thereof and a weighing spring 23 is attached at one end to such hook and at its opposite end said spring is held by an adjusting screw 24 extending through a side wall of the case and threadedly engaged at its inner end with a yoke 25 having its opposite ends engaged between the coils in said spring, and as shown in Fig. 9. The screw 24 has a head 26 located outside of the case as a means for turning the screw for adjusting purposes, and a spring 27 thrusting at one end against the yoke and at its opposite end against the wall of the case holds the adjusting screw from loose movement within the case.

A rack bar 28 secured to the upper surface of the spider has its teeth engaged with the teeth of a pinion 29 the axis of which is vertically disposed and its arbor 30 extending into a bearing recess in the bottom of the case and its upper end extending through a bearing opening in an arbor supporting bar 31, the latter extending across the case and being secured at its opposite ends to projections 32 from the upper edges of supporting side bars 33, the lower edges of said bars being secured firmly to the bottom of the case. Each end of each side bar has a notch halved into a notch in a side bar support 34, each of said side bar supports extending across the side bar to prevent tipping movement thereof, said supports being also firmly secured to the bottom of the case as by means of lugs projecting through said bottom and riveted on the underside thereof. That portion of each of said supports inside of the side bars comprises the rocker supports 16 hereinbefore mentioned.

The upper end of the arbor 30 projects through the bar 31 and has the arms of a dial 35 secured thereto, indicating characters, as numerals on the dial, being located to pass across a window 36 in the cover or platform. A stud 37 secured to the spider and projecting upwardly therefrom has one end of a piston rod 38 attached thereto, said rod extending from a piston in a dash pot 39. This dash pot is of any well known construction common to dash pots and is employed for the purpose of effecting a steady movement of the dial 35 and prevent undue movement thereof to and fro as such dial reaches the limit of movement, as to denote a certain weight.

In a preferred form of construction the spider is composed of two parts separated by a space 40, as shown in Fig. 4, the end section 41 of the spider comprising two of the branching arms at one end thereof. The two sections are joined by a plate, or a pair of plates, 42 preferably of triangular shape and located on opposite sides of the spider, the points of these triangular shaped plates being loosely attached, as by means of a pivot, to one of the spider sections and the opposite straight sides of said plates being rigidly secured to the opposite spider section, and as shown in Fig. 4.

In order to prevent lost motion between the pinion 29 and teeth of the rack bar 28 a spring 43 preferably of spiral form is interposed between the dial 35 and the arbor 30, said spring acting upon the pinion to maintain its teeth continuously pressing against the teeth of the rack bar.

An important feature of my invention resides in the manner of connecting the rockers 15 with the spider 18 in such a way that the constantly varying degrees of weight force applied by said rockers are met by a resistance which is constantly maintained in the same ratio, that is, the ratios of resistance and of application of weight force are always the same. This is graphically illustrated in Fig. 11 wherein it will be noted that the weight force applied by the supports 14 is always at right angles to the resistance offered by the branching arms 19 of the spider 18 and similarly the levers connecting these parts each comprises two arms which are fixed at right angles one to another. These levers each comprises that part of the rocker 15 with which the supports 14 are engaged and extending from the supports 16 to the edge of the rocker, as represented by the three short heavy lines in said Fig. 11, and the long heavy lines in said figure represent the spider supporting arms 17, the levers comprising these members being shown in three positions in said figure and as pivoted at G. In the normal position of these parts the effective length of the short arm of the lever which is shown in its upper position is represented by the space between the lines C, while the effective length of the long arm of the lever shown by the heavy line at the right in said figure is represented by the space between the lines D. As the lever moves to the intermediate position shown the short arm of the lever increases its effective length to an extent represented by the dimension A, thereby increasing the weight force of said short arm of the lever to its maximum. However, this increase in weight force of the short arm of the lever is met by an increase in the same ratio in the long arm of the lever to a length represented by the dimension B. It will therefore be seen that the change in effective weight force of one of the arms of the lever is compensated for by a change in the same ratio of the effective resistance offered by the other arm of the lever.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. In a weighing scale, a dial, a member operatively connected with said dial, said dial and member being movable in different planes parallel with each other, a platform movably mounted over said dial and having an opening through which said dial is visible, a rocker to sustain the weight of the platform and located above said member, an arm depending from said rocker, an interfitting connection between said arm and said member to impart said described movement to said member and means for resisting movement of said member.

2. In a weighing scale, a dial, a platform movably mounted over said dial and having an opening through which said dial is visible, and a connection between said platform and dial including rockers spaced apart, means for supporting said platform on the opposite ends of each of said rockers, means for sustaining said rockers, supporting arms depending from said rockers, a member suspended by said supporting arms for operating said dial and means for resisting movement of said member.

3. In a weighing scale, a dial, a platform movably mounted over said dial and having an opening through which said dial is visible, a connection between said dial and platform for imparting movement of the latter to the former, said connection including a shiftable member, means for resisting movement of said shiftable member, and a pivoted bell-crank lever having an upper substantially horizontal rocker portion supporting the platform and a depending leg on which the shiftable member is suspended, the pivotal mounting of the lever being such that variations in the effective length of the rocker portion are offset by corresponding variations in the same ratio of the depending legs.

4. In a weighing scale, spaced parallel bell-crank levers, a platform supported from the horizontal portions of said levers, a horizontal member suspended from the vertical portions of said levers and horizontal indicating mechanism overlying the member, said member being movable in a horizontal plane parallel to the plane of movement of the indicating mechanism to operate said indicating mechanism upon deflection of said platform.

5. In a weighing scale, spaced parallel bell-crank levers, a platform supported from the horizontal portions of said levers, a horizontal member suspended from the vertical portions of said levers, horizontal indicating mechanism overlying the member, said member being movable in a horizontal plane parallel to the plane of movement of the indicating mechanism to operate said indicating mechanism upon deflection of said platform, and a horizontal spring for resisting movement of said member.

6. In a weighing scale, spaced parallel bell-crank levers each including an upper substantially horizontal rocker portion and depending legs, a platform above the rocker portions with knife edge supports between the platform and each end of the rocker portions, a knife edge support for the rocker portions, a horizontal member suspended from the depending legs of the bell crank levers, and indicating mechanism, said member being movable in a horizontal plane parallel to the plane of movement of the indicating mechanism to operate said indicating mechanism upon deflection of said platform.

7. In a weighing scale, spaced parallel bell-crank levers, each including an upper substantially horizontal rocker portion and depending legs, the opposite ends of each rocker portion having adjacent V-shaped notches respectively opening at the upper and lower sides thereof, a platform having knife edge supports in the upwardly opening notches, knife edge supports for the bell-crank levers engaged in the downwardly opening notches, a horizontal member suspended from the depending legs of said levers, and indicating mechanism, said member being movable in a horizontal plane to operate said indicating mechanism upon deflection of said platform.

8. In a weighing scale, spaced parallel bell-crank levers, each including an upper substantially horizontal rocker portion and depending legs, the opposite ends of each rocker portion being longitudinally corrugated, perpendicular supports on which the corrugated ends are mounted, a platform supported in the corrugated ends of the rocker portions, a horizontal member suspended from the depending legs of said levers, and indicating mechanism, said member being movable in a horizontal plane to operate said indicating mechanism upon deflection of said platform.

9. In a weighing scale, spaced parallel pivoted bell-crank levers having horizontal and vertical portions at right angles to each other, a platform supported from the horizontal portions of said levers, a horizontal member suspended from the vertical portions of said levers, indicating mechanism, said member being movable in a horizontal plane to operate the indicating mechanism upon deflection of said platform, and means for resisting movement of the horizontal member, the pivotal movements of the bell-crank levers being such that varying degrees of weight force applied to the horizontal portions of the levers is met by a resistance to movement of the vertical portions of the levers whereby a constant ratio of movements of the two portions of the levers is maintained.

WILLIAM H. GREENLEAF.